United States Patent
Al Jadda et al.

(10) Patent No.: US 11,861,675 B2
(45) Date of Patent: Jan. 2, 2024

(54) METHODS FOR PRODUCT COLLECTION RECOMMENDATIONS BASED ON TRANSACTION DATA

(71) Applicant: Home Depot Product Authority, LLC, Atlanta, GA (US)

(72) Inventors: Khalifeh Al Jadda, Atlanta, GA (US); Huiming Qu, Atlanta, GA (US); Nian Yan, Atlanta, GA (US); Unaiza Ahsan, Atlanta, GA (US); San He Wu, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 39 days.

(21) Appl. No.: 16/785,104

(22) Filed: Feb. 7, 2020

(65) Prior Publication Data
US 2020/0334734 A1    Oct. 22, 2020

Related U.S. Application Data

(60) Provisional application No. 62/837,097, filed on Apr. 22, 2019.

(51) Int. Cl.
*G06Q 30/0601* (2023.01)
*G06N 3/08* (2023.01)
(Continued)

(52) U.S. Cl.
CPC ....... *G06Q 30/0631* (2013.01); *G06F 16/285* (2019.01); *G06F 16/9535* (2019.01); *G06N 3/08* (2013.01)

(58) Field of Classification Search
CPC .. G06Q 30/0601–0645; G06Q 30/0631; G06F 16/285; G06F 16/9535; G06N 3/08
(Continued)

(56) References Cited

U.S. PATENT DOCUMENTS 7,542,951 B1 * 6/2009 Chakrabarti ........... G06N 20/00
706/45
9,471,604 B2   10/2016 Chittar et al.
(Continued)

OTHER PUBLICATIONS

Yuri M. Brown, Complementary Item Recommendations at eBay Scale, Feb. 13, 2019, eBay (Year: 2019).*
(Continued)

*Primary Examiner* — Marissa Thein
*Assistant Examiner* — Anna Mae Mitros
(74) *Attorney, Agent, or Firm* — Greenberg Traurig, LLP

(57) ABSTRACT

A method includes determining a first taxonomy of an anchor product. The first taxonomy includes a plurality of levels for classifying products organized from a highest taxonomy level to a lowest taxonomy level. The method further includes determining a second taxonomy closest to the first taxonomy. The second taxonomy is associated with a group of products, the first taxonomy and the second taxonomy have at least a common highest taxonomy level, and the determination is made at least in part based on co-purchase data indicating that the anchor product and at least one product in the group of products are purchased together more often than products associated with other taxonomies are purchased with the anchor product. The method further includes determining a most similar product to the anchor product from the group of products of the second taxonomy and associating the anchor product and the most similar product with one another in a product collection.

22 Claims, 6 Drawing Sheets

(51) Int. Cl.
*G06F 16/9535* (2019.01)
*G06F 16/28* (2019.01)

(58) Field of Classification Search
USPC .................................... 705/26.1–27.2, 26.7
See application file for complete search history.

(56) References Cited

U.S. PATENT DOCUMENTS

| | | | |
|---|---|---|---|
| 10,275,818 | B2 | 4/2019 | Levy et al. |
| 11,151,608 | B1* | 10/2021 | Guo .................... G06Q 30/0631 |
| 2006/0020591 | A1* | 1/2006 | Kommers .......... G06F 16/90324 |
| 2014/0223488 | A1* | 8/2014 | Korst .................. G06F 16/9535 |
| | | | 725/53 |
| 2015/0046300 | A1 | 2/2015 | Menipaz et al. |
| 2016/0300245 | A1* | 10/2016 | Kapoor .............. G06Q 30/0203 |
| 2016/0350336 | A1 | 12/2016 | Checka et al. |
| 2017/0103434 | A1 | 4/2017 | Hurwitz et al. |
| 2017/0193587 | A1* | 7/2017 | Caster ................ G06F 16/9535 |
| 2017/0300985 | A1* | 10/2017 | Takahashi .............. G06Q 30/02 |
| 2018/0047083 | A1 | 2/2018 | Agarwal et al. |
| 2018/0137201 | A1* | 5/2018 | Longbin ............... G06F 16/285 |
| 2018/0247363 | A1 | 8/2018 | Agarwal et al. |
| 2018/0322208 | A1 | 11/2018 | Barrios Nunez et al. |
| 2019/0370879 | A1 | 12/2019 | Bhattacharjee |

OTHER PUBLICATIONS

Linden et al., Amazon.com Recommendations, Item-to-Item Collaborative Filtering, Industry Report, Jan.-Feb. 2003, IEEE Computer Society, 5 pgs.

ISA/U.S., International Search Report and Written Opinion issued in PCT/US2020/28410, dated Aug. 19, 2020, 15 pgs.

D. Bahdanau, K. Cho, and Y. Bengio. 2014. Neural machine translation by jointly learning to align and translate. arXiv preprint arXiv:1409.0473 (2014).

Jinze Bai, Chang Zhou, Junshuai Song, Xiaoru Qu, Weiting An, Zhao Li, and Jun Gao. 2019. Personalized Bundle List Recommendation. arXiv:cs.IR/1904.01933.

Moran Beladev, Liar Rokach, and Bracha Shapira. 2016. Recommender systems for product bundling. Knowledge-Based Systems 111 (2016), 193-206.

J. Bromley, I. Guyon, Y. LeCun, E. Siickinger, and R. Shah. 2014. Signature verification using a "siamese" time delay neural network. In NIPS'94.

R. Garfinkel, R. Gopal, A. Tripathi, and F. Yin. 2006. Design of a Shopbot and Recommender System for Bundle Purchases. Decision Support Systems 42, 3 (2006).

A. Graves. 2012. Supervised sequence labelling. Springer.

S. Hochreiter and J. Schmidhuber. 1997. Long short-term memory. Neural computation 9, 8 (1997).

G. Koch, R. Zemel, and R. Salakhutdinov. 2015. Siamese neural networks for one-shot image recognition. In JCML Deep Learning Workshop.

W. Lu, S. Chen, Keqian Li, and Laks V. S. L. 2014. Show Me the Money: Dynamic Recommendations for Revenue Maximization. Proceedings of the VLDB Endowment 7, 14 (2014).

T. Nedelec, E. Smirnova, and F. Vasile. 2017. Specializing Joint Representations for the Task of Product Recommendation. In Workshop on Deep Learning for Recommender Systems (DLRS'17).

S. Qi, N. Mamoulis, E. Pitoura, and P. Tsaparas. 2018. Recommending Packages with Validity Constraints to Groups of Users. Knowledge Information Systems 54, 2 (2018).

M. Schuster and K. Paliwal. 1997. Bidirectional recurrent neural networks. IEEE Transactions on Signal Processing 45, 11 (1997).

I. Sutskever, 0. Vinyals, and Q. Le. 2014. Sequence to sequence learning with neural networks. In NIPS' 14.

Z. Wang, Z. Jiang, Z. Ren, J. Tang, and D. Yin. [n. d.]. A Path-constrained Framework for Discriminating Substitutable and Complementary Products in E-commerce. In WSDM '18.

M. Zhou, Z. Ding, J. Tang, and D. Yin. [n. d.]. Micro Behaviors: A New Perspective in E-commerce Recommender Systems. In WSDM '18.

T. Zhu, P. Harrington, J. Li, and L. Tang. 2014. Bundle Recommendation in Ecommerce. In SJGJR '14.

* cited by examiner

METHODS FOR PRODUCT COLLECTION RECOMMENDATIONS BASED ON TRANSACTION DATA

CROSS-REFERENCE TO RELATED APPLICATION

This application claims the benefit of U.S. Provisional Patent Application No. 62/837,097, filed Apr. 22, 2019, the entire contents of which are hereby incorporated by reference in its entirety.

BACKGROUND

Both a retailer and its customers can benefit from the retailer providing recommendations for products that may be of use to the customers. The retailer may provide product recommendations on a website, in a brick-and-mortar store, or otherwise. Recommendations may increase the retailer's sales, and may introduce useful or necessary products to the customer that the customer may otherwise not have found or been aware of.

SUMMARY

An illustrative computer-implemented method includes determining, by one or more processors of one or more computing devices, a first taxonomy of an anchor product. The first taxonomy includes a plurality of levels for classifying products organized from a highest taxonomy level to a lowest taxonomy level. A greater number of products may be classified under the highest taxonomy level than under the lowest taxonomy level. The illustrative method further includes determining, by the one or more processors, a second taxonomy closest to the first taxonomy. The second taxonomy may be associated with a group of products, the first taxonomy and the second taxonomy have at least a common highest taxonomy level, and the determination that the second taxonomy is closest to the first taxonomy may be made at least in part based on co-purchase data indicating that the anchor product and at least one product in the group of products are purchased together more often than products associated with other taxonomies are purchased with the anchor product. The illustrative method further includes determining, by the one or more processors, a most similar product to the anchor product from the group of products of the second taxonomy. The illustrative method further includes associating, by the one or more processors, the anchor product and the most similar product with one another in a product collection.

An illustrative non-transitory computer-readable medium having computer executable instructions stored thereon that, upon execution by a processing device, cause the processing device to perform operations including determining a first taxonomy of an anchor product. The first taxonomy includes a plurality of levels for classifying products organized from a highest taxonomy level to a lowest taxonomy level. A greater number of products may be classified under the highest taxonomy level than under the lowest taxonomy level. The illustrative operations further include determining a plurality of taxonomies for which a predetermined number of the plurality of levels of the plurality of taxonomies may be the same as the plurality of levels of the first taxonomy. The illustrative operations further include determining a second taxonomy from the plurality of taxonomies that is closest to the first taxonomy by determining, based on co-purchase data, a percentage for each of the plurality of taxonomies that any product in the first taxonomy has been co-purchased with any product of each of the respective plurality of taxonomies and determining that the second taxonomy has the highest percentage of products that have been co-purchased with products of the first taxonomy. The illustrative operations further include determining a most similar product to the anchor product from a group of products of the second taxonomy. The illustrative operations further include associating the anchor product and the most similar product with one another in a product collection.

An illustrative computer-implemented method includes determining, by one or more processors of one or more computing devices, a first taxonomy of an anchor product. The first taxonomy includes a plurality of levels for classifying products organized from a highest taxonomy level to a lowest taxonomy level. A greater number of products may be classified under the highest taxonomy level than under the lowest taxonomy level. The illustrative method further includes determining, by the one or more processors, a plurality of taxonomies for which a predetermined number of the plurality of levels of the plurality of taxonomies is the same as the plurality of levels of the first taxonomy. The illustrative method further includes determining, by the one or more processors, a second taxonomy from the plurality of taxonomies that is closest to the first taxonomy by determining, based on predefined product collection data, a percentage for each of the plurality of taxonomies that any product in the first taxonomy is in a same collection as any product of each of the respective plurality of taxonomies and determining that the second taxonomy has the highest percentage of products that are in a same collection as products of the first taxonomy. The illustrative method further includes determining, by the one or more processors, a most similar product to the anchor product from a group of products of the second taxonomy. The illustrative method further includes associating, by the one or more processors, the anchor product and the most similar product with one another in a product collection.

DETAILED DESCRIPTION

Figure 1:
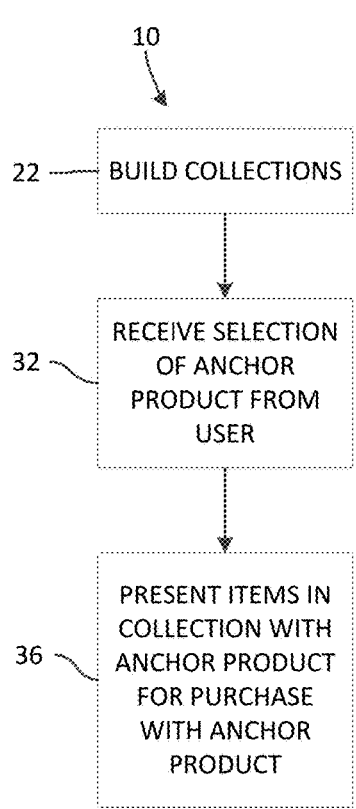
FIG. 1 is a flow chart illustrating an example method of presenting products in a collection to a user, in embodiments.

Purchasers of goods, such as appliances, fixtures, and the like, often purchase goods that belong to the same "collection"—products having similar or complementary features, aesthetic styles, etc. It may be beneficial to both the consumer and to the retailer offering collections of goods to present such collections automatically, for example, on a website respective of the retailer or a webpage respective of one or more items in the collection. For example, in response to a user selection of a product on a retailer website, the other items in a collection with that product may be displayed to the user.

Collections have been known to be manually-created. Manual creation and maintenance of a collection can be unduly burdensome for a large retailer, which may carry a large number of products and a large number of collections, and thus may have to frequently remove old products from and add new products to existing collections, create new collections entirely, or eliminate existing collections as products are removed from the retailer's offerings. Accordingly, automated determination of the content of collections can provide a substantial reduction of resources required by the retailer to create and maintain collections, and can further provide improved and more up-to-date collections to users. As a result, the need for users to navigate to different portions of a website of the retailer to find complementary products may be reduced, the workload of the servers and systems supporting the website may therefore be reduced, and the responsiveness and functionality of those servers and systems thereby improved.

The present disclosure includes systems and methods for providing product and other item purchase recommendations. The recommendations may be provided in conjunction with the viewing, selection, or purchase of a so-called "anchor product" or "anchor item" through an electronic user interface, such as one on an e-commerce website, a mobile application, a kiosk in a brick-and-mortar store, or elsewhere. Further, the recommendations may be provided by an in-store associate to a customer based on that customer's question about or interest in a product. Still further, recommendations may be provided on a digital price display (e.g., in a brick-and-mortar retail store) associated with the anchor product. The recommendations may include items, such as products, that are in a collection with the anchor item. For the remainder of this disclosure, recommendations will generally be described as being provided on a website. Such disclosure is by way of example only. The same or similar functionality described herein as being provided on or through a website may also be provided through a mobile application, in-store kiosk, or otherwise.

Providing product collections to a user according to the present disclosure may enable a user to more quickly view and/or purchase numerous items through an electronic interface, such as a website. For example, product collections may be provided to a user along with an anchor product selected by the user, and the user may purchase both the selected anchor product and the product(s) in the collection with a reduced number of clicks relative to known processes (or other user interactions such as voice commands, touch screen gestures, etc.). In various embodiments, graphical control elements may be provided that enable the user to select and purchase the anchor product and the product(s) in the collection from a single page or interface portion, thereby reducing user time and effort by eliminating the need for the user to separately navigate to the product page of each product(s) in a collection.

As a result, providing product collections according to the techniques of the present disclosure solves an internet-centric problem—streamlining user interaction with a website or other electronic user interface—through methods and systems necessarily rooted in computer technology. Additionally, the techniques described herein provide improved functioning of a website accessed by a user. For example, according to the various techniques described herein, a database or lookup table of product collections may be built before a user accesses the website and selects an anchor product to view and potentially purchase. Because the database or lookup table of product collections is already established, the product(s) related to a selected anchor product in a collection can be looked up in the database or lookup table and populated on the website for viewing and potential purchase by the user. Using such techniques, the product(s) in a collection can be looked up and loaded onto the website interface viewed by the user faster than if determining which products belong in a collection was determined in response to a user selecting an anchor product to purchase.

In addition, the methods and systems described herein provide an improved graphical user interface (GUI). Displaying at least one anchor product and one or more products in a collection with that anchor product on a single interface is a demonstrable improvement that enables a user to quickly and easily select, unselect, add to a cart, purchase, view, and otherwise interact with anchor and relevant accessory products on a single interface, such as a webpage. In other words, the methods and systems herein provide for a particular manner of summarizing and presenting information by and on electronic devices, and include specific manners of displaying a limited set of relevant information to a user, rather than using conventional user interface methods to display generic information on a computer. In particular, the improved interfaces described herein prevent a user from having to view the products in a collection on more than one interface or webpage. This allows a user to see the most relevant data quickly, and saves the user from the time and hassle of navigating through multiple interfaces and webpages.

Because users of a website may want to purchase more than one product during a single visit to a website as part of a single transaction, the systems and methods described herein provide for recommended bundles or collections to be presented to a user to enable the user to find and select multiple products in a simpler manner. Accordingly, the methods and systems herein may be used to identify sets of products that can be presented together in a single transaction and share the same style, high level functionality, and/or other characteristics but serve different needs (e.g., the different products in a collection are not interchangeable).

To classify products into collections, transactional data, domain knowledge (e.g., predetermined product classifications including taxonomy/hierarchy information, predetermined product collection information, etc.), and/or content information of the products (e.g., characteristics, taxonomies/hierarchies, title, description, color, type, etc.) may be used as described herein. For example, transactional data and/or domain knowledge may be used to identify taxonomies/hierarchies that include products that potentially may be included in a collection with an anchor product. Domain knowledge and/or content information of the products in those taxonomies/hierarchies may be used by a deep similarity model to identify products that belong to the same collection using content information of the products. The methods and systems described herein may also recommend collections of products with increased accuracy when compared to manually created collections of products.

As a specific, non-limiting example, a person may wish to renovate their bathroom. The user may use a computing device to go to an online retailer website, and find a desired sink faucet. After finding the sink faucet, the user may also want relevant products other products for a bathroom. The relevant products may include, as examples, a toilet paper holder, a shower faucet, a bathtub, etc. These products along with the sink faucet may be referred to herein as a collection of products, and the sink faucet originally selected by the user may be referred to herein as an anchor product. The different products in a collection may be configured to fit together in a collection (e.g., all be of the same color, all be of the same style) and may all be bought together by the user.

Various products may include various product information (e.g., product description, title, color, brand name). That product information may be used, for example, to find products that match in style (e.g., products with same color). However, product information alone may not be enough to determine a useful product collection, because using product information to find similar items may yield interchangeable products. For example, if a sink faucet is an anchor product, other sink faucets may be found if only product information is compared, because other sink faucets may have similar product descriptions and other characteristics. However, a goal of the present disclosure is to, given a particular anchor product, recommend products that are not interchangeable.

To determine products to recommend in a collection, additional information, such as domain information and/or transactional information, may be used to define collections and thereby recommend additional products to a user that are part of a collection. For example, domain information including predefined information about a product's classification, also referred to herein as a taxonomy or hierarchy, may be used to define collections. Such domain information may be determined using an automated process or may be manually entered. Domain information including manually-defined collections may also be used according to various embodiments described herein. Manually grouped product collection data may be used by generalizing the known manual product collections to add products that are not associated with the manually-defined collection (e.g., to expand or otherwise alter the collection). In various embodiments, transactional information may be used in combination with or instead of domain information. For example, historical transactions that contain a set of products that belong to a same high level of a taxonomy may contain products that belong to the same collection. For example, in a single transaction a user may purchase three different products that belong to three different classifications within a bathroom taxonomy: a sink faucet, a towel bar, and a bathroom faucet. The more often such products are purchased together, the more likely it is that such products are part of a collection. Aggregations of these types of transactions and using those products respective taxonomies may be used as described herein to find frequent patterns of users purchasing products together in a collection. This information may be used to generate collection recommendations for a given anchor product.

First, with respect to FIGS. 1 and 2, an illustrative method and illustrative system for automatically determining collections and providing collection-based product recommendations will be described at a high level. With respect to FIG. 3, an illustrative method for automatically building collections will be described. With respect to FIG. 4, an example product collection will be described. With respect to FIG. 5, example brand loyalty statistics based on groups of products actually purchased together will be described. With respect to FIG. 6, the number of relevant recommendations for product collections achieved using various example methods for determining product collections will be described.

Finally, with respect to FIG. 7, an illustrative computing environment that may be used in conjunction with the methods and processes of this disclosure will be described.

Referring to the drawings, in which like numerals refer to the same or similar features in the various views, FIG. 1 is a flow chart of an illustrative method 10 for providing item purchase recommendations to a customer. FIG. 2 is a block diagram of an illustrative system 12 for providing item purchase recommendations to a user. The method 10 of FIG. 1 and the system 12 of FIG. 2 are described in conjunction below.

Generally, the method 10 may include receiving a selection of a product from a user and presenting a product collection based on the user-selected product. A product selected by a user, with which recommendations may be provided according to the present disclosure, may be referred to as an "anchor product" or "anchor item." The item recommendations may include items that are in a collection with the anchor item.

The system 12 generally includes computer hardware and functional capability for carrying out the method 10 and other methods and functions of this disclosure. The system 12 may include a transactions database 14, a collection processing system 16, and a server 18 in electronic communication with a plurality of user devices $20_1, 20_2, \ldots 20_N$, which may be referred to individually as a user device 20 or collectively as user devices 20. The system 12 may perform one or more methods, processes, etc. of this disclosure and may provide one or more electronic user interfaces and/or graphical presentations to the user. The system 12 may also host or otherwise provide one or more websites, mobile applications, and the like, in embodiments.

The method 10 will be described in terms of a user, such as a customer, interacting with a website. The server 18 may host or provide that website, and accordingly may receive input from the user through the website. The server 18 may exchange information with the collection processing system 16 to carry out one or more steps of the method 10, in embodiments. In other embodiments, the server 18 and the collection processing system 16 may be the same processing system or apparatus.

The method 10 may be performed, in part or in full, by a retailer, in embodiments. That is, the system 12 may be owned or operated by or on behalf of a retailer, in embodiments. The method 10 may also be carried out, in full or in part, by some other type of entity. A website having the features referenced herein may be the website of a retailer, and the brick-and-mortar stores referenced herein may be stores of the same retailer. Additionally or alternatively, a website having the features described herein and the brick-and-mortar stores may be associated with different entities. A website having the features described herein may list and sell items sold by the retailer, in embodiments. Additionally or alternatively, such a website may list and sell items sold by third parties.

The method 10 may include a step 22 of building item collections. An embodiment of the step 22 is illustrated in and will be described (as a method) in greater detail with respect to FIG. 3. With continued reference to FIGS. 1 and 2, the collection building step 22 may generally include analyzing records of transactions in the transactions database 14 to determine which product taxonomies have been purchased together and analyzing product feature data 30 to determine which specific products are most similar to each other. The building step 22 may result in a set of item collections 24 stored in memory of the collections processing system 16. In an embodiment, the collections 24 may include a plurality of lists, each list comprising a plurality of items that are in a collection together.

Figure 2:
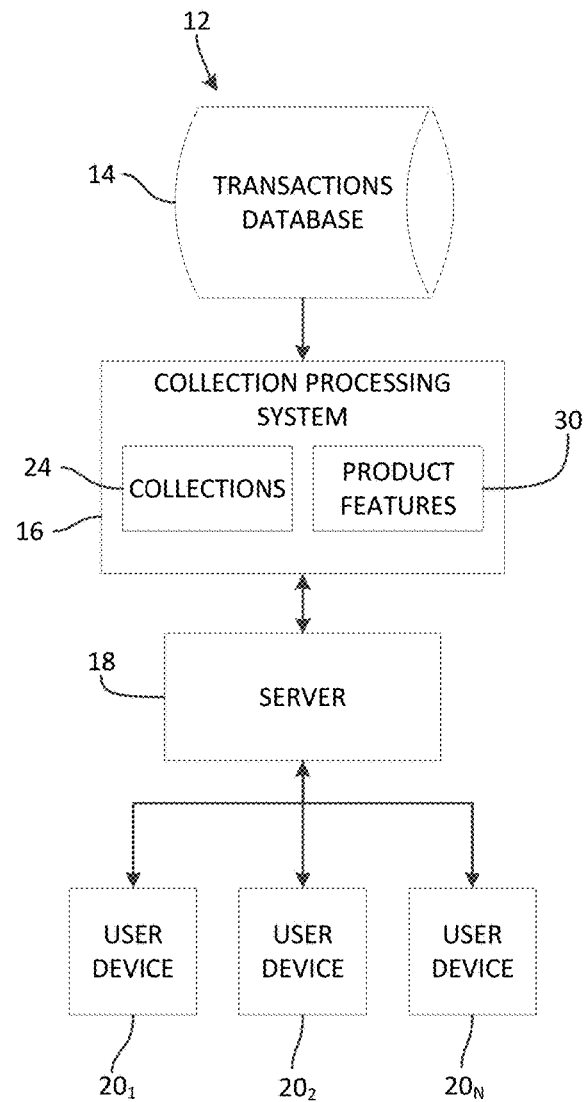
FIG. 2 is a block diagram view of an example system for providing product collection recommendations to a user, in embodiments.

With continued reference to FIGS. 1 and 2, the method 10 may further include a step 32 of receiving a selection of an anchor product from a user. The selection may be received, for example, by the collection processing system 16 from a user device 20 through a website provided by the server 18 or through another electronic user interface such as a mobile application, in-store kiosk, etc. As noted above, the website may be, for example, an e-commerce site associated with or operated by or on behalf of a retailer. The selection may be, for example only, a click on the anchor product on a page of the website, navigation to a product information page of the anchor product on the website, a user action to add the anchor product to the user's shopping cart on the website, etc.

In an embodiment, a selection of an anchor product may be received from a user through a voice search or request through the electronic user interface. For example, the electronic user interface with which the user interacts may be on a mobile application, and the mobile application may be configured to capture voice search requests from the user. The server 18 or user device 20 may be configured with voice recognition software to parse the user's voice search or voice request to determine an anchor product. In response to the voice search or voice request, the server may provide a list of items in a collection with the anchor product to the user through the electronic user interface, as described below.

In another embodiment, a selection of an anchor product may be received from a user through a text-based (e.g., SMS or MMS) request. For example, the user may transmit a text message order for an anchor product from a user device 20 and, in response, the server 18 may transmit a list of items in a collection with the anchor item to the user device 20.

With continued reference to FIGS. 1 and 2, the method 10 may further include a step 36 of presenting additional items in a collection with the anchor product for purchase with the anchor item. The additional items may be presented, for example, on the website adjacent to a listing of the anchor item. In embodiments, where the anchor item is selected by the user via the user's navigation to a product information page of the anchor item, the additional items may be presented on the anchor item's product information page. The additional items may be presented in conjunction with graphical control elements that enable the user to select the additional items and/or anchor item for purchase, singularly or in combination. The graphical control elements may enable the user to purchase the items by initiating a purchase (e.g., adding to cart) or by completing a purchase (e.g., checking out, performing a 1-click purchase, etc.), in embodiments.

The method 10 advantageously provides product recommendations to customers on a website and enables users to purchase recommended products with a reduced number of clicks. Instead of separately selecting and separately navigating to a product information page of each of the recommended additional items, the method 10 provides a quicker way for the customer to purchase the anchor product and the additional items. Furthermore, the method 10 reduces the number of pages to which a user must navigate, thereby reducing server workload and improving server functionality.

The presenting step 36 may include presenting a graphical display of additional items that are part of a collection with the user-selected anchor product without additional website navigation by the user. For example, the additional products may be displayed on or over a product information page so that, from the product information page of the anchor product, the user can add the anchor product and one or more of the recommended additional items to the user's cart. In addition to, or instead of, providing the product recommendations on the product information page of the anchor product, product recommendations may be provided in a web page showing the user's cart, on a product search page, or otherwise.

The "user" noted in the method may be a customer that is shopping on a website provided by the server with a user device 20, in embodiments. The user device 20 may be a personal computer, user mobile computing device, or other computing device. Additionally or alternatively, the server 18 may provide all or part of an in-store checkout or informational environment or digital price display information, and the user devices 20 may be in-store kiosks or digital price displays.

The systems and methods for building product collections described herein may use domain information such as product taxonomies (also referred to herein as hierarchies) to make product collection recommendations. For a given set of products $P=\{p_1, \ldots, p_k\}$ offered by an online retailer, each product $p_1$ may be associated with a set of attributes $A_i=\{a_{i1}, \ldots, a_{il}\}$. Examples of attributes (also referred to herein as product information) may be title, description, brand, color, etc. An online retailer may use a taxonomy T to organize all products in a catalog. A taxonomy may include a set of categories and relationships among those categories. For example, a set of categories $C=\{C_1, \ldots, C_m\}$ may be organized into hierarchies using a set of subclass relationships $R=\{r(C_i,C_j), \forall C_i,C_j \in C, i<j\}$. For example, $r(C_i,C_j)$ means that $C_j$ is subclass of $C_i$. A hierarchy or taxonomy may therefore be ordered set of categories that share subclass relationships, where $h=(C_1, C_2, \ldots, C_k-1, C_k)$ where $r(C_i, C_i+1) \in R$, $i=1 \ldots k$. $C_1$ may be defined as a root category. As just one non-limiting example, a highest taxonomy level may be bath products, then further narrowed in a subclass for bathroom faucets, then further narrowed in a subclass for bathroom sink faucets, then narrowed to a lowest taxonomy level subclass for single handle-type bathroom sink faucets (e.g., stylized herein as bath products>bathroom faucets>bathroom sink faucets>single handle). Accordingly, the highest level (e.g., bath products) will have more products in it than the lower subclasses. Additionally, each product $p_1$ may therefore be assigned to exactly one hierarchy and a set of all distinct hierarchies may be defined as H.

Figure 4:
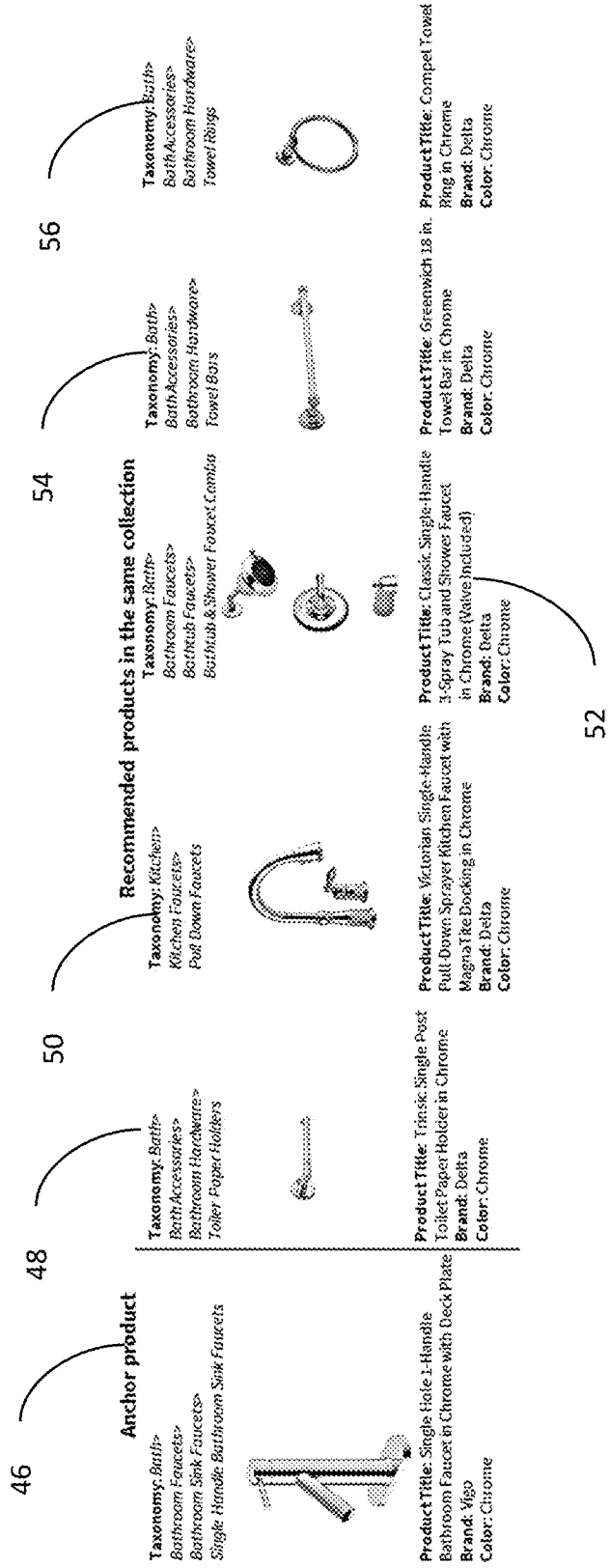
FIG. 4 illustrates an example product collection, in embodiments.

Therefore, product collections may be defined as follows. For an anchor product $p_a$ with a set of features (e.g., product information, title, product description, taxonomy, color, brand, etc.), a set of collection products $P_c=\{p_{c1}, \ldots, p_{ck}\}$ is generated such that the set of products $\{p_a, p_{c1}, \ldots, P_{ck}\}$ with the respective hierarchies $H_c=\{h_a, h_{c1}, \ldots, h_{ck}\}$ are desirable by the users. For example, if a bathroom sink faucet is an anchor product, then the set of products that may belong to an example collection may be a towel bar, a toilet paper holder, and a towel ring as shown in FIG. 4.

When the systems and methods described herein are applied, products from the same taxonomy as the anchor product are not selected to be in a product collection. In other words, products are selected for a collection such that the products in the collection are not interchangeable with one another (e.g., $p_a$'s taxonomy should be different from all the taxonomies that $p \in P_c$ belong to). Similarly, the products selected to be in a product collection as being related to an anchor product may also be selected from different taxonomies from one another, such that the products in the collection are not interchangeable with one another (e.g., it is not allowed to have two products in $P_c$ that belong to the same lowest taxonomy level). In order to determine product collections that do not have interchangeability between products in a particular collection, the systems and methods described herein may be configured to determine that a set of hierarchies or taxonomies that the collection products are assigned to, $H_c$, cannot contain duplicate hierarchies (e.g., $\forall h_i, h_j \in H_c: h_i \neq h_j$). In other words, multiple products classified in the same lowest taxonomy level may not exist in the same product collection. However, product information of products from different lowest taxonomy levels may still be analyzed so that products in a product collection $P_c$ may have similar or the same attributes with the anchor product $p_a$ such that they match the style of the anchor product. For example, a product collection may be determined with products that have the same or similar color, relevant title, and/or description (e.g., $\forall p_i \in P_c: color_{pi} = color_{pa}, title_{pi} \approx title_{pa}, description_{pi} \approx description_{pa}$). The taxonomies/hierarchies of products in a collection may also share the same root category (e.g., highest taxonomy level) $C_1$ with one another and with the anchor product $p_a$ (e.g., $\forall h_i, h_j \in H_c: C_{i1} = C_{j1}$). In various embodiments, the products in a collection may or may not share one or more intermediate sub-classes/levels of their taxonomies as well.

In addition to automatic product collection determinations, manually created or predefined product collections may also be used to make collection recommendations to a user. For example, predefined or manually created collections may be stored in the collections 24 of the collection processing system 16 of FIG. 2. Manufacturers and/or brand owners of products may predefine collection information for a set of products p along with a set of binary relationships $(p_i, p_j)$. Relationships between products may be bidirectional and may indicate that products belong to the same collection(s). For example, a manufacturer, brand owner, etc. may provide a set of products $P_m = \{p_{m1}, \ldots, p_{mq}\}$ along with a set of bidirectional relationships between products of the form: $R_m = \{r_m(p_{mi}, p_{mj}), \ldots, r_m(p_{mk}, p_{ml})\}$. A relationship $r_m(p_{mi}, p_{mj})$ indicates that the products $p_{mi}$ and $p_{mj}$ have the same style, color, or some other characteristic. Given such relationships, collections of products simply by extracting all relationships $r_m$ that involve an anchor product $p_a$. However, generating collections of products based on manually provided product relationships may be hard to scale and/or may be expensive to maintain because product relationships may constantly need updating. For example, a retailer may offer many different products for sale that are sourced from many different manufacturers and/or brand owners. Therefore, information from those entities about relationships between products may only involve products from those sellers.

Generating and maintaining manual collection relationships may also be difficult because new manual relationships may need to be created whenever a new product is introduced. Manual collection information may also not change dynamically over time, due to customer preferences, product availability, etc., and would be difficult to update manually based on those factors. Retailers may also offer a large number of products, so manual collection relationships may not scale well. In other words, manually entering product relationships for collection determination may be time consuming and difficult.

Manual information about product relationships may also be difficult to infer product collection information from as defined herein. As described herein, products in the same collection should not be interchangeable (e.g., a collection should include a sink faucet and a towel bar of a same color and not two sink faucets of the same color). For example, a provided pair of products $(p_i, p_j)$ may have a characteristic (e.g., color) that indicate $p_i$ and $p_j$ are part of the same collection, but such a characteristic does not automatically indicate that $p_i$ and $p_j$ are not interchangeable. For example, $p_i$ and $p_j$ may be two variants of a faucet. In this case, the relation between $p_i$ and $p_j$ may not be directly useful for suggesting $p_j$ as a complement of $p_i$.

The incentives of manufacturers, brand owners, and other sellers of products to retailers may also be different from the retailer's incentives. For example, sellers of products to retailers may be interested in promoting certain items over others and, as a result, they may provide relationships that are biased towards such promotions. This approach may lead to bundling of products that are of the same brand. Retailers may not be incentivized to bundle or recommend product collections according to brand, as a retailer may be more interested in maximizing overall sales rather than sales of a particular brand. Research of actual customer transaction data also indicates that customers may co-purchase products (e.g., plumbing hardware for a bathroom) that are not of the same brand. Thus, any production collection determinations made based on manual information from manufacturers, brand owners, and other sellers of products to retailers may yield product collection recommendations that are not optimized for end-consumer preferences. In other words, customers are not necessarily loyal to just one brand when buying items, but instead may be more interested in matching color and style. For example, a user may buy a faucet of brand A and a showerhead of brand B simply because they look good together as they have matching color and matching style.

Figure 5:
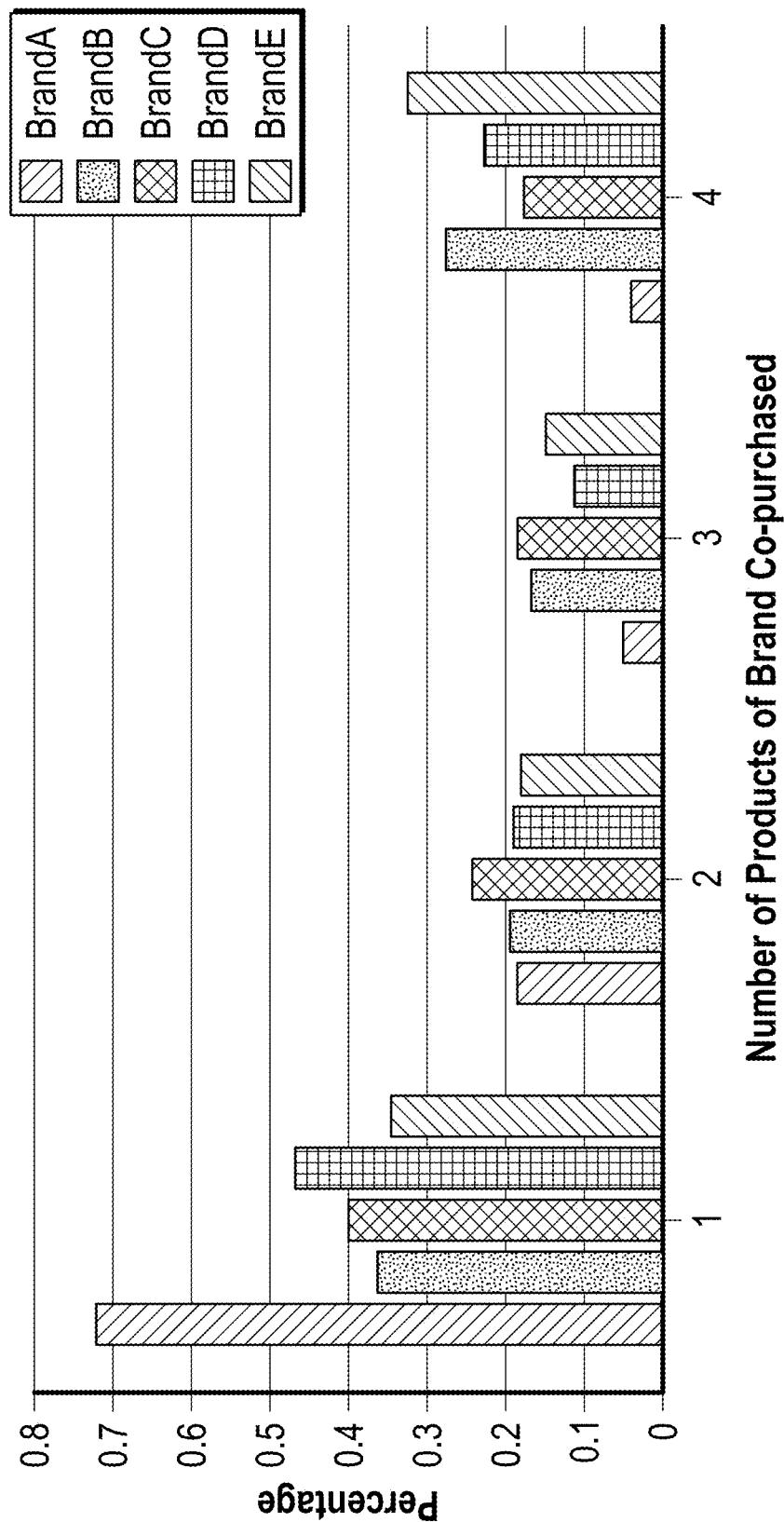
FIG. 5 illustrates example brand loyalty statistics based on groups of products actually purchased together, in embodiments.

FIG. 5 illustrates example brand loyalty statistics based on groups of products actually purchased together, in embodiments. In particular, FIG. 5 shows the loyalty to five popular brands computed from 99,754 transactions through an online retailer that involved exactly 4 products that belonged to the bathroom category for the year 2018. The X axis shows the number of products that belong to the same brand, while the Y axis shows the percentage of transactions. For example, for all transactions that included a product from Brand A (where Brand A illustrated as the first bar of each group of five bars in the graph), the first point (1, 0.72) shows that 72% of the transactions including a Brand A product involved only one (1) product that belongs to Brand A (all three (3) other products in those transactions were of different brand). Approximately 18% of all transactions including a Brand A product included two (2) Brand A products (2, 0.18), approximately 6% of all transactions including Brand A product included three (3) Brand A products (3, 0.06), and only approximately 4% of all transactions including Brand A products included all four (4) Brand A products (4, 0.04). The other Brands B-E shown in FIG. 5 demonstrate a similar conclusion—end-consumers are not necessarily brand loyal when co-purchasing products. Accordingly, product collection recommendations that may be biased toward recommending products of the same brand together may not be optimal.

Accordingly, described herein are various embodiments for identifying relationships between products that indicate they are good fits for a collection of products. Those relationships may be used to recommend products for a given anchor product that are in that anchor product's collection, and thereby provide helpful recommendations to an end-consumer who, for example, may be online shopping. For example, a product currently selected by a user on an online retailer website may be considered an anchor product. Candidate pairs (e.g., potential products that may be recommended as in a product collection with the anchor product) may be generated, and those candidate pairs may be ranked using the products' respective titles, text descriptions, colors, brands, etc.

Figure 3:
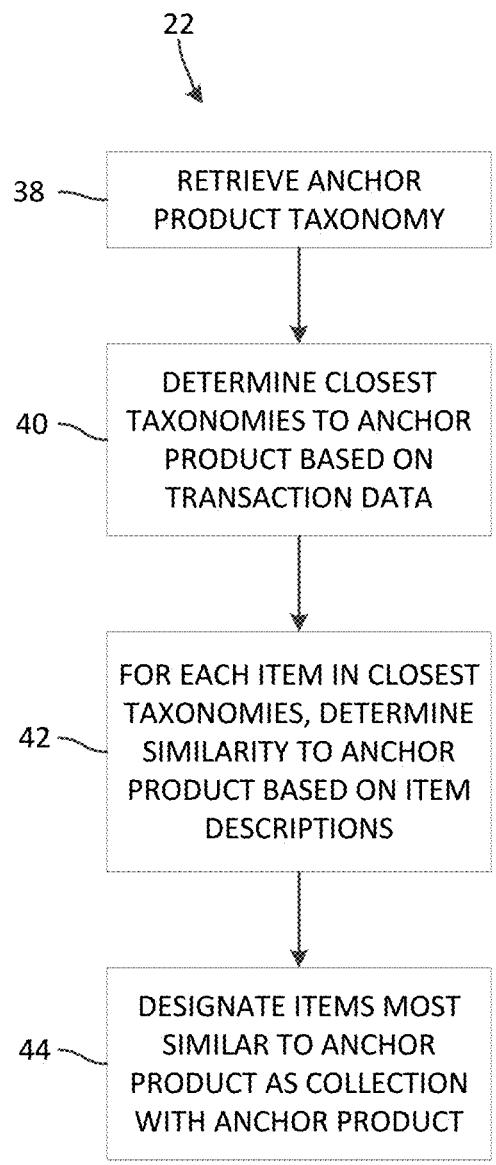
FIG. 3 is a flow chart illustrating an example method of determining similar products for inclusion in a product collection with an anchor product, in embodiments.

FIG. 3 is a flow chart illustrating an embodiment of a method 22 for building product collections. The method 22 may find use as step 22 in the method 10 of FIG. 1, in an embodiment. In the description of FIG. 3 below, reference is also made to FIG. 4, which illustrates an example product collection, in embodiments.

The method 22 will be described for building a product collection with respect to a single selected anchor product. However, the method 22 may be repeated for a plurality of products (e.g., some or all products of a retailer). Accordingly, the method 22 may be repeated for a sufficient set of products until a desired quantity of products and/or desired categories or types of products are included in respective collections.

The method 22 may first include a step 38 that includes retrieving an anchor product taxonomy of an anchor product. Although the anchor product is referred to with respect to the method 22, the steps of the method 22 may be performed before or after an anchor product is actually selected by a user, e.g., through a website of a retailer. In this way, a product collection may be built dynamically where the method 22 is performed after user selection of the anchor product, or may be built out before the user selects the anchor product using the method 22. In the latter example, the method 22 may be applied to many products, and information about the product collections may be stored, e.g., in collection processing system 16 as collections 24. In this way, the predetermined collections may be recalled, e.g., from a lookup table, whenever the user selects an anchor product, and information about a product collection may be used to recommend one or more other products that were previously determined to be in a collection with the selected anchor product.

The anchor product taxonomy may be a hierarchy of classification information about the anchor product, which information may have been manually or automatically defined. A product taxonomy may have different taxonomy levels. Each product may be assigned to a classification at each level of the taxonomy. For example, a taxonomy may include four taxonomy levels L1, L2, L3, and L4, where L1 is the highest level (e.g., most general) of the taxonomy and L4 is the lowest level (e.g., most specific) of the taxonomy. As one example, the taxonomy for a particular bathroom faucet having a single handle may be, from highest taxonomy level to lowest taxonomy level, "Bath→Bathroom Faucets→Bathroom Sink Faucets→Single Handle Bathroom Sink Faucets". The anchor product 46 shown in FIG. 4, the Single Hole 1-Handle Bathroom Faucet in Chrome with Deck Plate, has such a taxonomy. In such an example, the L1 taxonomy level is "Bath" while the L4 taxonomy level is "Single Handle Bathroom Sink Faucets." In various embodiments, the lower taxonomy levels may be considered to include a given taxonomy level and all of its higher level taxonomies. For example, the L3 taxonomy level of the anchor product 46 in FIG. 5 may be considered to be "Bath→Bathroom Faucets→Bathroom Sink Faucets." However, the embodiments described herein may be practiced regardless of whether lower taxonomy levels are considered to include the higher taxonomy levels or not. Where two products have the same taxonomy, the products may have the same taxonomy at each taxonomy level. Where two products are considered to have close taxonomies, the products may have at least one, but not all, same taxonomy levels. Some or all levels of the product taxonomy may be reflected in a hierarchical set of pages on a website of the retailer, in some embodiments.

Taxonomies may provide powerful information because products with the same taxonomy may satisfy the same or very similar needs. As a result, taxonomy information may be useful to determine product collection recommendations. Taxonomy information may particularly be helpful because products that are interchangeable may not desirable to be included in the same product collection, as described herein. However, products with close taxonomies may have similar features and/or complementary purposes such that the products are desirable for recommendation together as part of a product collection.

The method 22 may further include a step 40 that includes determining the closest taxonomies to the anchor product taxonomy. In an embodiment, the closest lowest-level taxonomies may be determined. In other words, the taxonomies that match the anchor product taxonomy at all but the lowest taxonomy level may be determined to be the closest taxonomies, or these taxonomies may be used as a factor for determining the closest taxonomies (e.g., for selecting candidates for the closest taxonomies). In various embodiments, closest taxonomies may be selected that have at least one level (e.g., the highest taxonomy level) or some other predetermined number of taxonomy levels that are the same as the anchor product taxonomy. In other words, the taxonomies that have the predetermined number of taxonomy levels that match the anchor product taxonomy may be determined to be the closest taxonomies, or these taxonomies may be used as a factor for determining the closest taxonomies (e.g., for selecting candidates for the closest taxonomies). In this way, by determining the closest taxonomies based on matching one or more taxonomy levels with the anchor product taxonomy, products with duplicate/interchangeable functionality to the anchor product (e.g., products that have the exact same taxonomy) may be omitted from eventual collection determinations and recommendations because products in the same taxonomy as the anchor product are not considered to have a closest taxonomy in the step 40 of FIG. 3. For example, the products recommended for the anchor product in FIG. 4 (e.g., products 48, 50, 52, 54, 56) are determined to belong to the closest taxonomies of the anchor product 46.

The closest taxonomies may also be determined, in some embodiments, based on transactional data. Closest taxonomies may be determined automatically, in some embodiments. For example, product taxonomies that include products that are purchased together most often (e.g., through an e-commerce site and/or in brick-and-mortar stores) with products in the anchor product taxonomy may be considered the closest taxonomies to the anchor product taxonomy. By considering co-purchase data for the products in the entire anchor product taxonomy (e.g., by aggregating co-purchase transaction data together based on taxonomy), more closest taxonomies may be determined than if only the co-purchase data for the anchor product itself was considered. In some embodiments, this may be useful where there is limited transaction data for the anchor product. In some embodiments, selecting closest taxonomies may be accomplished by only considering co-purchase data of the anchor product itself rather than all the products of the anchor product taxonomy. In some embodiments, a system may check for closest taxonomies with a predetermined number of taxonomy levels in common, and if a threshold number of closest taxonomies are not determined and/or the taxonomies analyzed do not meet a threshold percentage of co-purchase percentages, the system may widen the search to check taxonomies with fewer and/or no taxonomy levels in common until enough closest taxonomies are determined.

In various embodiments, the taxonomy levels and co-purchase data may both be considered for determining closest taxonomies to an anchor product taxonomy. For example, the co-purchase data may only be considered for taxonomies that have a predefined number of taxonomy levels in common with the anchor product taxonomy to determine the closest taxonomies at the step 40.

A predefined number of closest taxonomies may be determined for the anchor product taxonomy, in some embodiments. For example, five (5) closest taxonomies may be determined based on co-purchase data or any other method. In other embodiments, the number of closest taxonomies determined may depend on the content of the transaction data. For example, a minimum percentage threshold may be applied, such that all taxonomies including products that have been purchased with the anchor product's taxonomy a minimum threshold percentage of all co-purchase data involving the anchor product taxonomy may be considered to be the closest taxonomies at the step 40. In the example of FIG. 4, each of the products 48, 50, 52, 54, and 56 may belong to a respective one of the five taxonomies that have products that are most likely to be co-purchased with products of the taxonomy associated with the anchor product 46.

In an example embodiment, transactional data may be aggregated per taxonomy as described herein. Co-purchase data may be considered where each transaction has more than one product. In other words, only transactional data where more than one product was bought together in a single transaction may be considered. To determine candidate closest taxonomies (or otherwise limit which taxonomies' co-purchase data are considered with respect to the anchor product taxonomy), only co-purchase transaction data for taxonomies with the same highest level (e.g., L1=Bath) taxonomy as an anchor product (e.g., the faucet anchor product 46 in FIG. 4) taxonomy may be considered, in some embodiments. Thus, a similarity between an anchor product taxonomy $T_i$ an another taxonomy $T_j$ that has a same highest taxonomy level as $T_i$ may be computed as follows: $\text{sim}(T_i, T_j)=P(T_i \& T_j)/P(T_i)$, where $P(T_i \& T_j)$ is the probability that two products $p_i \in T_i$ and $p_j \in T_j$ are co-purchased and $P(T_i)$ is the probability that $p_i \in T_i$ is purchased. Accordingly, a probability that products in the anchor product taxonomy $T_i$ and another taxonomy $T_j$ are co-purchased together may be calculated. Similar probabilities between the anchor product taxonomy $T_i$ and other taxonomies may also be calculated. Taxonomies for which the co-purchase probabilities are highest may be selected as the closest taxonomies at the step 40 of FIG. 3.

In the alternative to and/or in addition to step 40, closest taxonomies to an anchor product may also be determined based on manually defined production collection information. In particular, like transactional data above, manually defined collection information may be aggregated based on taxonomies so that product collections and product collection recommendations may be expanded beyond just the manually defined product collections. Such a method may be based on actual product collection information from merchants, manufacturers, brand owners, or other sellers of goods to retailers, or may be based on product collection information determine from other information provided by those sellers. Manual product collection relationships may also be defined by the retailer.

In an example embodiment, candidate closest taxonomies may be considered. For example, only manually defined product collection relationships for taxonomies with the same highest level (e.g., L1=Bath) taxonomy as an anchor product (e.g., the faucet anchor product 46 in FIG. 4) taxonomy may be considered. All of the product collection relationships of every product in the anchor product taxonomy are considered, such that the other taxonomies that have the highest number of product collection relationships with the products in the anchor product taxonomy may be determined as the closest taxonomies to the anchor product taxonomy. Thus, a similarity between an anchor product taxonomy $T_i$ an another taxonomy $T_j$ that has a same highest taxonomy level as $T_i$ may be computed as follows: $\text{sim}(T_i, T_j)=P(T_i \& T_j)/P(T_i)$, where $P(T_i \& T_j)$ is the probability that two products $p_i \in T_i$ and $p_j \in T_j$ appear in the same collection and $P(T_i)$ is the probability that $p_i \in T_i$ appears in the collection relationships. Accordingly, a probability that products in the anchor product taxonomy $T_i$ and another taxonomy $T_j$ have relationships according to manually defined product collection information is calculated. Similar probabilities between the anchor product taxonomy $T_i$ and other taxonomies may also be calculated. Taxonomies for which the probabilities of manually defined product collection relationships between the anchor product taxonomy and the other taxonomies are highest may be selected as the closest taxonomies.

The method 22 may further include a step 42 that includes designating products/items most similar to the anchor product as determined in the step 40 as in a collection with the anchor product. In an embodiment, for a given taxonomy from the closest taxonomies determined in step 40, each product within the taxonomy is evaluated for its similarity to the anchor product (i.e., how "close" that product is to the anchor product). The closest product to the anchor product in each of the closest taxonomies may be selected for inclusion in a product collection. That is, a bidirectional relationship between the anchor product and the products selected from the closest taxonomies may be established such that the products may be recommended for one another as part of a collection.

Determining product similarity between an anchor product and plurality of products in a taxonomy (e.g., one of the determined closest taxonomies) may include, in some embodiments, inputting data respective of the anchor product and of each of the plurality of products in the taxonomy into a trained neural network to generate a vector respective of each product. Input to the neural network for each product may include, for example, a product description, product title, product brand, product color, and/or other textual or other information related to the product. The neural network may have been trained on manually-created sets of similar products, in some embodiments. A cosine similarity function may be applied to the respective vectors of each pairing of anchor product and second product to determine which second product(s) from the plurality of products is/are most similar to the anchor product within the taxonomy.

In various embodiments, recurrent neural networks such as long short-term memory (LSTM) networks may be used to perform natural language processing to generate product vectors. Bidirectional LSTMs (biLSTM), are an extension of an LSTM architecture in which an input sequence is read from left to right and from right to left by two separate LSTMs. The output of the combined model is a concatenated output of the two LSTMs. Such a biLSTM may be used in various embodiments to determine similar products to an anchor product as described herein. For example, to generate text embeddings for products, a Siamese biLSTM architecture may be used. Siamese networks may be trained to discriminate between a class identity of input pairs. In various embodiments, such Siamese networks may trained to discriminate between pairs of products in the same collection versus pairs of products belonging in a different collection. A Siamese network may include input pairs $x_i$, $x_j$ that are passed through a deep network F. The embedding outputs $F(x_i)$, $F(x_j)$ may be joined by a metric function at the top. Then, a cosine similarity $\cos(F(x_i), F(x_j))=(F(x_i) \cdot F(x_j))/(\|F(x_i)\|\|F(x_j)\|)$ may be used as a metric function combined with a sigmoid activation. This may be referred to as the cosine similarity layer.

Pre-processing may be applied to raw text before it is input into the neural networks described herein to train a model for comparing text related to products for determining whether products should be included in a same product collection. For example, stop words (e.g., commonly used words such as a, an, the, in, etc.) may be removed and all text may be lower-cased. Sentence padding and truncating may also be applied so that sentences have a standard length despite the text associated with products being made up of variable length sentences. For example, product descriptions may be padded or truncated to be one hundred (100) words and product titles may be padded or truncated to be twenty (20) words long. Pairs of similar products (e.g., pairs for which bidirectional relationships are established to indicate a product collection relationship) based on manually defined product relationships and/or based on co-purchase data as described herein may be used to train a model for recognizing pairs that should be in a product collection. In other words, once the model is trained, text relating to products (e.g., product description and title) may be input into the model to output product pairs that are similar and may be characterized as being in a same product collection. The model may be further trained using dissimilar products (e.g., products that are not in the same collection). For example, for each pair of similar products (e.g., product pairs that have a manually defined product collection relationship), three (3) pairs of dissimilar products may be generated by randomly sampling a product that does not belong to the same product collection as the similar products. The dissimilar products may further enhance the training of the model for determining similar products.

An example Siamese biLSTM architecture as described herein may include two biLSTMs, one for product description and one for product title. Input word embedding dimensions may be set to 128 for both LSTMs, and each LSTM may have a hidden size of 256 units, and dropout and recurrent dropout may be used for regularization. A dropout rate of 0.5 may be used, for example. The hidden states of the two biLSTMs may be concatenated and used as an input to the cosine similarity layer. A network may be trained for 20 epochs using an optimizer (e.g., RMSProp) with a batch size of 128. Once networks are trained concatenated outputs of two LSTMs may be used to generate the product embeddings.

The method 22 may further include a step 44 that includes designating one or more closest products from one or more of the closest taxonomies as a collection with the anchor product. In some embodiments, one product from each of the closest taxonomies may be designated for inclusion in the collection. In such an embodiment, a resulting collection would include the anchor product and a single respective product from each of the closest taxonomies. In other embodiments, more than one product from one or more of the closest taxonomies may be included in a collection.

In other words, after closest taxonomies are determined (step 40) and similar products from the closest taxonomies are determined (step 42), one or more collections of products may be generated, such as the product collection shown in FIG. 4. The designation of items most similar to an anchor product to define product collections as in step 44 may include establishing bidirectional relationships between the anchor product and each of the products in the collection. In this way, if one of the products that is not the anchor product is ever selected by a user, for example on an online retailer website, that selected product may become the anchor product for purposes of making collection recommendations. For example, if the product 48 of FIG. 4 is selected by a user of an online retailer website, the anchor product 46 may be recommended as part of a collection with the product 48, because the relationship for product collections between the anchor product 46 and the product 48 is bidirectional.

An embodiment of a method for building product collections is shown in Algorithm 1 below. Algorithm 1 may be implemented in order to execute an embodiment of the various methods and systems described herein, including an example embodiment of the method 22 shown in and described with respect to FIG. 3.

```
Algorithm 1:  input: An anchor product a and the number N of products desired
              to retrieve to add to a collection with the anchor product a.
              output: A list l of N products that belong to the same collection
              with the anchor product a.
              Retrieve taxonomy T for the anchor product a;
              Compute the N closest taxonomies to T (closest taxonomies are
              computed using, e.g. co-purchase data);
              foreach taxonomy n in N do
                    Retreive the set of products P that belong to this taxonomy;
                    foreach product p_i in P do
                          Retrieve the title, description, brand, and color;
                          Compute the cosine similarity sim for the pair (a, p_i)
                          (e.g., using co-purchase data)
                    end
                    Rank all similarities sim(a, p_i) computed;
                    Add to the list l the product p_i for which the similarity
                    sim(a, p_i) has the highest value;
              end
```

Various embodiments herein were evaluated using human experts to double check product collection determinations and recommendations. In particular, two methods of automatically creating collections were compared against manually created product collection relationships (e.g., those determined by sellers or manufacturers of products). The two methods tested in the evaluation include (1) an embodiment where determining closest taxonomies (e.g., at the step 40 of FIG. 3) was performed using transactional (co-purchase) data aggregated on a taxonomy level as described herein and (2) an embodiment where determining closest taxonomies (e.g., at the step 40 of FIG. 3) was performed using manually entered collection information that was aggregated on a taxonomy level as described herein.

For the evaluation, 487 products were selected for which there were exactly five (5) collection products designated for each according to the manually created product collection information from product sellers/merchants. The 487 products were also selected because they are each part of the same highest taxonomy level (e.g., L1), in this case Bath. In calculating closest taxonomies (e.g., at step 40 of FIG. 3), the five (5) most similar taxonomies were calculated using the two different methods (e.g., using aggregated co-purchase transactional data and aggregated manually entered collection information) for each of the 487 anchor products. Then, a most similar product from each of the five (5) closest taxonomies is selected to consider as part of a product collection for a given anchor product (e.g., steps 42 and 44 of FIG. 3).

To evaluate the efficacy of each method using expert validators, the expert validators were shown the set of 487 anchor products along with the recommended collection products generated by the two methods described above, as well as the third baseline of the manually created product collections. The order of the products was shuffled as presented to different validators to reduce bias amongst the validators. The validators were also given specific instructions about what constitutes a collection and what does not, specifically by providing the following scenario: "Someone needs to renovate her bathroom. For this, the person goes to a home improvement retailer website and finds a sink faucet that they really like. Given this sink faucet the person now wants to buy, what would other relevant products be for their bathroom? Relevant products may range from a toilet paper holder to a shower faucet or even a bathtub." The experts were also instructed that collections should not contain products that are interchangeable with the anchor product (e.g., if the anchor product is a sink faucet, then a recommendation of another sink faucet is not considered to be relevant as a recommendation for a product collection). The experts were further instructed that collections should not include product recommendations that are interchangeable with one another. For example, if the anchor product is a sink faucet, the recommendations should not include more than one bathtub faucet. However, the exception was noted that for some products users may desire different types of the same product (e.g., two different types of towel bars for a bathroom). The experts were further instructed that products in the same collection should, where possible, match one another in color and/or style but do not necessarily need to be of the same brand. Again, exceptions are noted, as someone may want a different color bathtub than the bathtub faucet, for example. Ultimately, the experts were instructed to think rationally and critically as to what would be helpful product recommendations for someone actually looking at a given anchor products (e.g., at a bathroom hardware product such as a sink faucet).

For each of the 487 anchor products, the five (5) recommended products according to the various methods (e.g., using aggregated transactional data, aggregated manual relationships, or actual manually defined relationships) were shown to the validators. The validators ranked each product in a collection as a relevant recommendation or as a not relevant recommendation. For each anchor product, the accuracy was calculated by dividing the number of relevant recommendations (e.g., here 0-5) for a given anchor product by the number of recommendations (e.g., here 5). For each of the three methods evaluated, the average accuracy was averaged across all 487 products.

In the results, both of the methods using embodiments described herein (e.g., using aggregated transactional data and using aggregated manual relationships) outperformed the manually defined product collection relationships when scored by the expert validators. The manually defined product collection relationships had an accuracy score of 0.51 with a standard deviation of 0.32. The product collection relationships using aggregated transactional data had an accuracy score of 0.82 and a standard deviation of 0.13. The product collection relationships using the aggregated manual relationships had an accuracy score of 0.75 and a standard deviation of 0.13. An unpaired t-test was performed on the results, and the comparison between any two of the three methods yielded a difference that was considered extremely statistically significant (e.g., a p value less than 0.0001).

Figure 6:
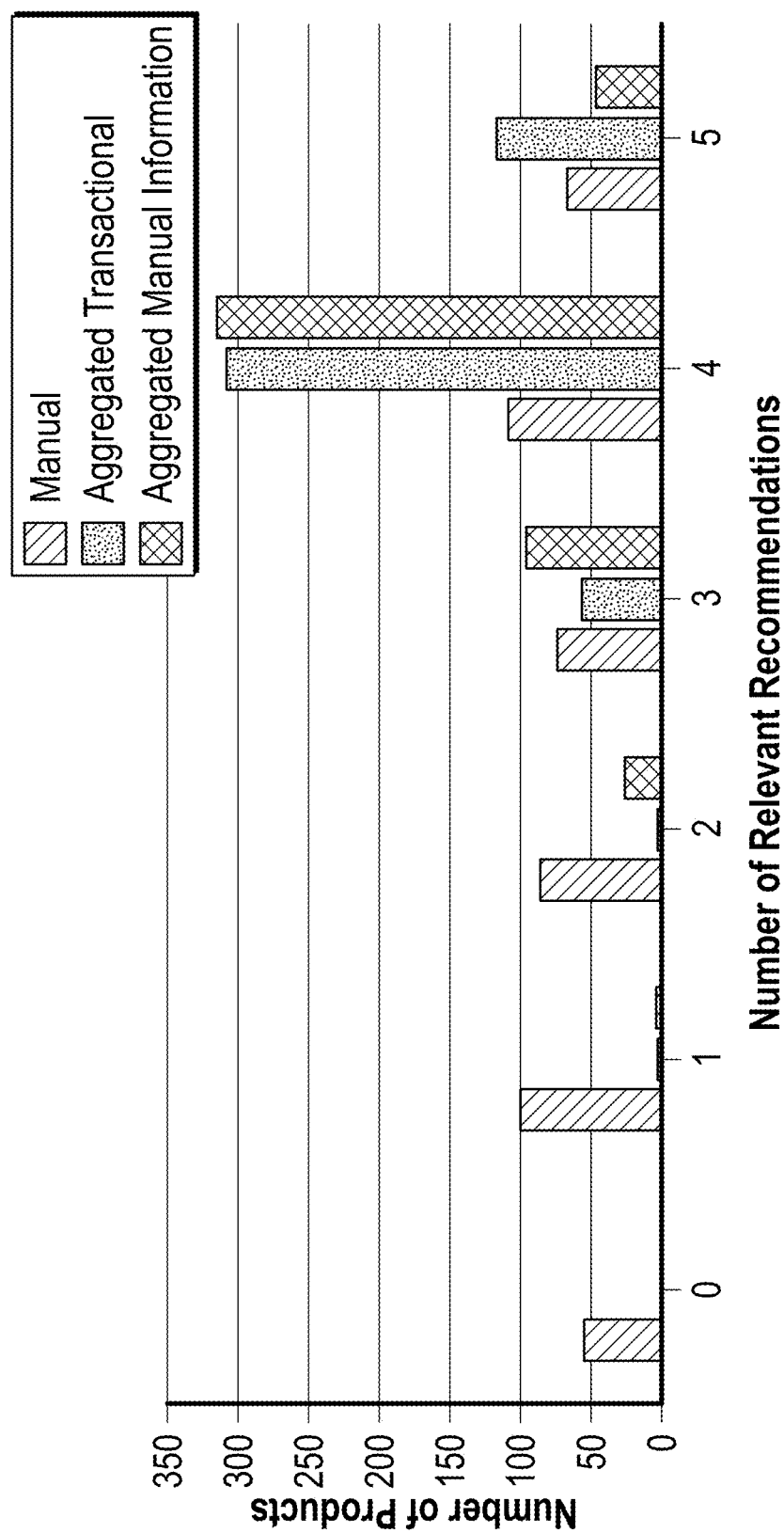
FIG. 6 illustrates example quantities of relevant recommendations for example product collections according to various example methods for determining product collections, in embodiments.

To further evaluate the results, for each of the three evaluated methods, a plot was created, shown in FIG. 6, illustrating the number of collections for each method having zero (0), one (1), two (2), three (3), four (4), or five (5) relevant recommendations. For example, for the manually defined product relationships, the experts deemed that there were 108 of 487 products that had four out of five relevant recommendations, while the aggregated transactional method yielded 308 of the 487 products having four out of five relevant recommendations.

In a second evaluation, 500 anchor products were considered for which there was no manually defined product collection recommendation information available. Product collection recommendations were calculated using aggregated transactional information as described herein, and the results were again reviewed and scored by expert validators. In this test, the validators found that there was an average accuracy score of 0.87 and a standard deviation of 0.17.

Figure 7:
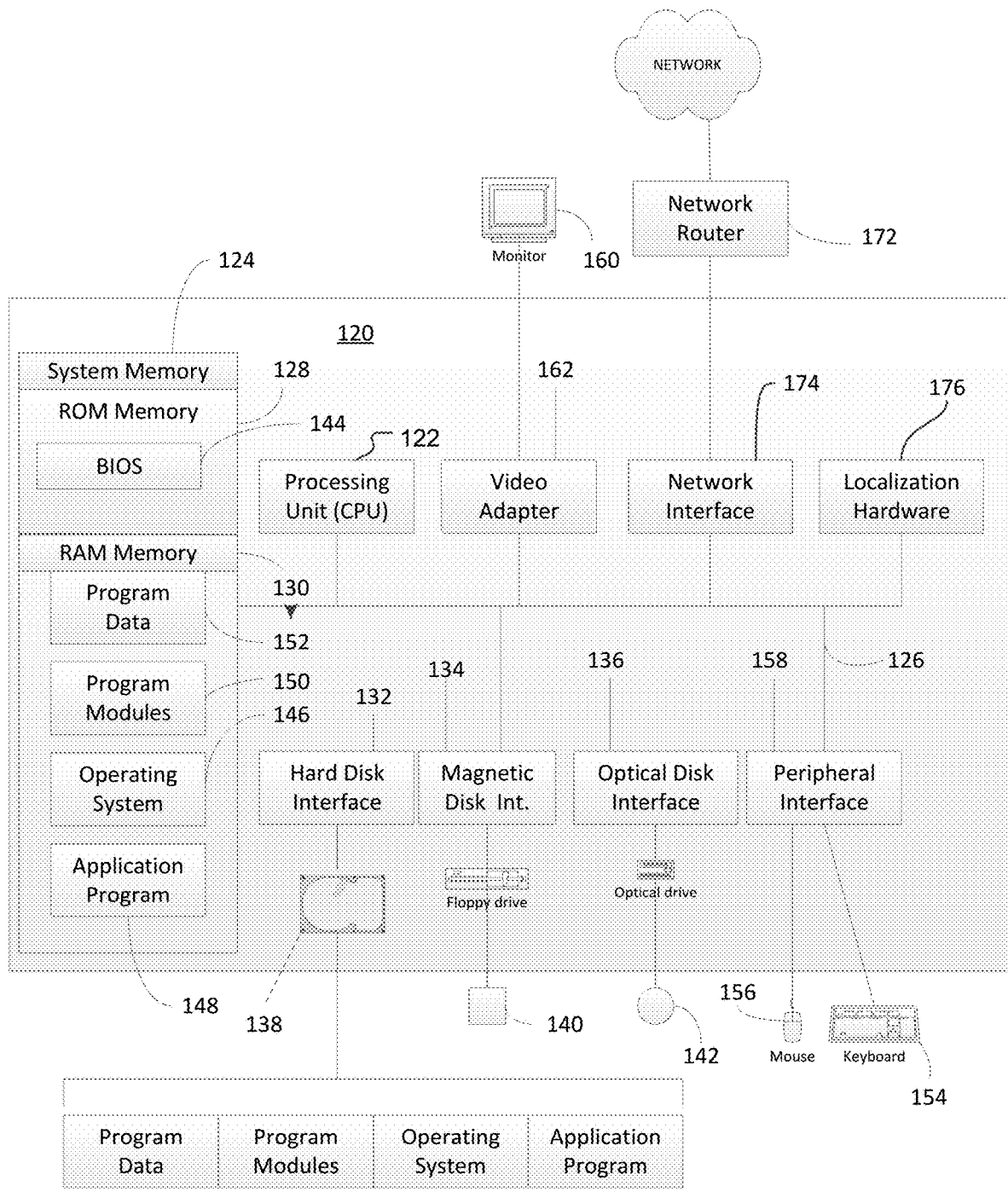
FIG. 7 is a diagrammatic view of an example user computing environment, according to some embodiments.

FIG. 7 is a diagrammatic view of an illustrative computing system that includes a general purpose computing system environment 120, such as a desktop computer, laptop, smartphone, tablet, or any other such device having the ability to execute instructions, such as those stored within a non-transient, computer-readable medium. Furthermore, while described and illustrated in the context of a single computing system 120, those skilled in the art will also appreciate that the various tasks described hereinafter may be practiced in a distributed environment having multiple computing systems 120 linked via a local or wide-area network in which the executable instructions may be associated with and/or executed by one or more of multiple computing systems 120.

In its most basic configuration, computing system environment 120 typically includes at least one processing unit 122 and at least one memory 124, which may be linked via a bus 126. Depending on the exact configuration and type of computing system environment, memory 124 may be volatile (such as RAM 130), non-volatile (such as ROM 128, flash memory, etc.) or some combination of the two. Computing system environment 120 may have additional features and/or functionality. For example, computing system environment 120 may also include additional storage (removable and/or non-removable) including, but not limited to, magnetic or optical disks, tape drives and/or flash drives. Such additional memory devices may be made accessible to the computing system environment 120 by means of, for example, a hard disk drive interface 132, a magnetic disk drive interface 134, and/or an optical disk drive interface 136. As will be understood, these devices, which would be linked to the system bus 126, respectively, allow for reading from and writing to a hard disk 138, reading from or writing to a removable magnetic disk 140, and/or for reading from or writing to a removable optical disk 142, such as a CD/DVD ROM or other optical media. The drive interfaces and their associated computer-readable media allow for the nonvolatile storage of computer readable instructions, data structures, program modules and other data for the computing system environment 120. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 120.

A number of program modules may be stored in one or more of the memory/media devices. For example, a basic input/output system (BIOS) 144, containing the basic routines that help to transfer information between elements within the computing system environment 120, such as during start-up, may be stored in ROM 128. Similarly, RAM 130, hard drive 138, and/or peripheral memory devices may be used to store computer executable instructions comprising an operating system 146, one or more applications programs 148 (such as a Web browser, retailer's mobile app, retailer's point-of-sale checkout and ordering program, and/or other applications that execute the methods and processes of this disclosure), other program modules 150, and/or program data 152. Still further, computer-executable instructions may be downloaded to the computing environment 120 as needed, for example, via a network connection.

An end-user, e.g., a customer, retail associate, and the like, may enter commands and information into the computing system environment 120 through input devices such as a keyboard 154 and/or a pointing device 156. While not illustrated, other input devices may include a microphone, a joystick, a game pad, a scanner, etc. These and other input devices would typically be connected to the processing unit 122 by means of a peripheral interface 158 which, in turn, would be coupled to bus 126. Input devices may be directly or indirectly connected to processor 122 via interfaces such as, for example, a parallel port, game port, firewire, or a universal serial bus (USB). To view information from the computing system environment 120, a monitor 160 or other type of display device may also be connected to bus 26 via an interface, such as via video adapter 162. In addition to the monitor 160, the computing system environment 120 may also include other peripheral output devices, not shown, such as speakers and printers.

The computing system environment 120 may also utilize logical connections to one or more computing system environments. Communications between the computing system environment 120 and the remote computing system environment may be exchanged via a further processing device, such a network router 172, that is responsible for network routing. Communications with the network router 172 may be performed via a network interface component 174. Thus, within such a networked environment, e.g., the Internet, World Wide Web, LAN, or other like type of wired or wireless network, it will be appreciated that program modules depicted relative to the computing system environment 120, or portions thereof, may be stored in the memory storage device(s) of the computing system environment 120.

The computing system environment 120 may also include localization hardware 176 for determining a location of the computing system environment 120. In embodiments, the localization hardware 176 may include, for example only, a GPS antenna, an RFID chip or reader, a WiFi antenna, or other computing hardware that may be used to capture or transmit signals that may be used to determine the location of the computing system environment 120.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method, comprising:
   determining, by one or more processors of one or more computing devices associated with a retailer website, a first taxonomy of an anchor product, wherein:
   the first taxonomy comprises a plurality of levels for classifying products organized from a highest taxonomy level to a lowest taxonomy level; and
   a greater number of products are classified under the highest taxonomy level than under the lowest taxonomy level;
   determining, by the one or more processors, a second taxonomy closest to the first taxonomy, wherein:
   the second taxonomy is associated with a group of products,
   the first taxonomy and the second taxonomy have at least a common highest taxonomy level,
   each of the first taxonomy of the anchor product and the second taxonomy includes at least three levels,
   the determination that the second taxonomy is closest to the first taxonomy is made at least in part based on co-purchase data indicating that the anchor product and at least one product in the group of products are purchased together more often than products associated with other taxonomies are purchased with the anchor product,
   the determination that the second taxonomy is closest to the first taxonomy further comprises determining that at least the two highest levels of the first taxonomy and the second taxonomy are exactly the same, and
   the first taxonomy and the second taxonomy have at least different lowest taxonomy levels;
   determining, by the one or more processors, a most similar product to the anchor product from a group of products associated with the lowest level of the second taxonomy, such that the first taxonomy of the anchor product and the second taxonomy of the most similar product have at least the two highest levels that are exactly the same and the lowest levels that are different, wherein the determining the most similar product from the group of products further comprises:
   training a neural network using manually-created sets of similar products;
   inputting product information of the anchor product and product information of each product of the group of products into the trained neural network;
   performing, using a cosine similarity layer of the trained neural network, a comparison between product information of the anchor product and product information of each product of the group of products, the comparison comprising applying a cosine similarity function to at least one vector of the anchor product and at least one vector of each product of the group of products; and
   determining, based on the comparison, that the product information of the anchor product is closest to product information of the most similar product;
   associating, by the one or more processors, the anchor product and the most similar product with one another in a product collection, and
   sending, by the one or more processors to a user computing device, data structured such that the most similar product is displayed on a display of the user computing device along with the anchor product on a display of the user computing device as part of a single interface or webpage of the retailer website provided by the one or more computing devices associated with the retailer website.

2. The computer-implemented method of claim 1, further comprising:
   receiving a selection of the anchor product from a user electronic device;
   determining that the most similar product is in the product collection with the anchor product; and
   sending, to the user electronic device, information for presenting the most similar product along with the anchor product on a display of the user electronic device responsive to the selection of the anchor product.

3. The computer-implemented method of claim 1, wherein the comparison comprises performing a cosine similarity comparison between text of the product information of the anchor product and text of the product information of each product of the group of products.

4. The computer-implemented method of claim 1, wherein the determination that the second taxonomy is closest to the first taxonomy further comprises:
   determining a plurality of taxonomies for which each of a plurality of levels of each of the plurality of taxonomies is the same as the plurality of levels of the first taxonomy except the lowest taxonomy level, wherein the second taxonomy is one of the plurality of taxonomies; and
   determining that the group of products associated with the second taxonomy has been purchased together with the anchor product more frequently than any other group of products associated with the remaining plurality of taxonomies.

5. The computer-implemented method of claim 1, wherein the determination that the second taxonomy is closest to the first taxonomy is made at least in part based on co-view data indicating that the anchor product and the at least one product in the group of products are viewed by users during a single session more often than groups of products associated with other taxonomies.

6. The computer-implemented method of claim 1, further comprising determining a third product to associate with the anchor product in the product collection, wherein the third product is selected from a second group of products associated with a third taxonomy that is a next closest to the first taxonomy after the second taxonomy.

7. The computer-implemented method of claim 6, further comprising:
   receiving a selection of the anchor product from a user electronic device;
   determining that the most similar product and the third product are both in the product collection with the anchor product; and
   sending, to the user electronic device, information for presenting the most similar product and the third product along with the anchor product on a display of the user electronic device responsive to the selection of the anchor product.

8. The computer-implemented method of claim 1, further comprising:
   determining a plurality of taxonomies for which a predetermined number of a plurality of levels of each of the plurality of taxonomies is the same as the plurality of levels of the first taxonomy;

determining the second taxonomy from the plurality of taxonomies by:

determining, based on co-purchase data, a percentage for each of the plurality of taxonomies that any product in the first taxonomy has been co-purchased with any product of each of the respective plurality of taxonomies, and determining that the second taxonomy has the highest percentage of products that have been co-purchased with products of the first taxonomy.

9. The computer-implemented method of claim 8, further comprising:

receiving a selection of the anchor product from a user electronic device;

determining that the most similar product is in the product collection with the anchor product; and sending, to the user electronic device, information for presenting the most similar product along with the anchor product on a display of the user electronic device responsive to the selection of the anchor product.

10. The computer-implemented method of claim 8, wherein determining the most similar product from the group of products further comprises:

performing a comparison between product information of the anchor product and product information of each product of the group of products; and determining, based on the comparison, that the product information of the anchor product is closest to product information of the most similar product.

11. The computer-implemented method of claim 10, wherein the comparison comprises performing a cosine similarity function between text of the product information of the anchor product and text of the product information of each product of the group of products.

12. The computer-implemented method of claim 8, wherein the anchor product and the most similar product are different brands of products.

13. The computer-implemented method of claim 1, wherein the most similar product is a first most similar product, the method further comprising:

determining, by the one or more processors, a plurality of taxonomies for which a predetermined number of a plurality of levels of each of the plurality of taxonomies is the same as the plurality of levels of the first taxonomy;

determining, by the one or more processors, a third taxonomy from the plurality of taxonomies that is closest to the first taxonomy by:

determining, based on predefined product collection data, a percentage for each of the plurality of taxonomies that any product in the first taxonomy is in a same collection as any product of each of the respective plurality of taxonomies, and determining that the third taxonomy has the highest percentage of products that are in a same collection as products of the first taxonomy;

determining, by the one or more processors, a second most similar product to the anchor product from a group of products of the third taxonomy; and associating, by the one or more processors, the anchor product and the second most similar product with one another in the product collection.

14. The computer-implemented method of claim 13, further comprising:

receiving a selection of the anchor product from a user electronic device;

determining that the second most similar product is in the product collection with the anchor product; and sending, to the user electronic device, information for presenting the second most similar product along with the anchor product on a display of the user electronic device responsive to the selection of the anchor product.

15. The computer-implemented method of claim 13, wherein determining the second most similar product from the group of products of the third taxonomy further comprises:

performing a comparison between product information of the anchor product and product information of each product of the group of products of the third taxonomy; and determining, based on the comparison, that the product information of the anchor product is closest to product information of the second most similar product.

16. The computer-implemented method of claim 15, wherein the comparison between product information of the anchor product and product information of each product of the group of products of the third taxonomy comprises performing a cosine similarity function between text of the product information of the anchor product and text of product information of each product of the group of products of the third taxonomy.

17. The computer-implemented method of claim 13, wherein the second most similar product and the anchor product are a same color of product.

18. The computer-implemented method of claim 1, wherein the product collection comprises all items of a same color or finish.

19. The computer-implemented method of claim 1, wherein the product collection comprises all items used in a same type of room in a home.

20. The computer-implemented method of claim 19, wherein the same type of room is a bathroom.

21. A computer-implemented method, comprising:

determining, by one or more processors of one or more computing devices, first taxonomy data associated with an anchor item, wherein:

the first taxonomy data comprises a plurality of levels for classifying items organized from a highest taxonomy level to a lowest taxonomy level; and a greater number of items are classified under the highest taxonomy level than under the lowest taxonomy level;

determining, by the one or more processors, second taxonomy data closest to the first taxonomy data, wherein:

the second taxonomy data is associated with a group of items, the first taxonomy data and the second taxonomy data have at least a common highest taxonomy level, each of the first taxonomy data of the anchor item and the second taxonomy data includes at least three levels, the determination that the second taxonomy data is closest to the first taxonomy data further comprises determining that at least the two highest levels of the first taxonomy data and the second taxonomy data are exactly the same, and the first taxonomy data and the second taxonomy data have at least different lowest taxonomy levels;

determining, by the one or more processors, a most similar item to the anchor item from a group of items associated with the lowest level of the second taxonomy data, such that the first taxonomy data of the anchor item and the second taxonomy data of the most similar item have at least the two highest levels that are exactly the same and the lowest levels that are different, wherein the determining the most similar product from the group of products further comprises:

training a neural network using manually-created sets of similar products;

inputting product information of the anchor product and product information of each product of the group of products into the trained neural network;

performing, using a cosine similarity layer of the trained neural network, a comparison between the product information of the anchor product and the product information of each product of the group of products, the comparison comprising applying a cosine similarity function to at least one vector of the anchor product and at least one vector of each product of the group of products; and determining, based on the comparison, that the product information of the anchor product is closest to product information of the most similar product; and associating, by the one or more processors, the anchor item and the most similar item with one another in an item collection.

22. A computer-implemented method, comprising:

determining, by one or more processors of one or more computing devices, a first taxonomy of an anchor product, wherein:

the first taxonomy comprises a plurality of levels for classifying products organized from a highest taxonomy level to a lowest taxonomy level; and a greater number of products are classified under the highest taxonomy level than under the lowest taxonomy level;

determining, by the one or more processors, a second taxonomy closest to the first taxonomy, wherein:

the second taxonomy is associated with a group of products, the first taxonomy and the second taxonomy have at least a common highest taxonomy level, each of the first taxonomy of the anchor product and the second taxonomy includes at least three levels, the determination that the second taxonomy is closest to the first taxonomy is made at least in part based on co-purchase data indicating that the anchor product and at least one product in the group of products are purchased together more often than products associated with other taxonomies are purchased with the anchor product, the determination that the second taxonomy is closest to the first taxonomy further comprises determining that at least the two highest levels of the first taxonomy and the second taxonomy are exactly the same, and the first taxonomy and the second taxonomy have at least different lowest taxonomy levels;

determining, by the one or more processors, a most similar product to the anchor product from a group of products associated with the lowest level of the second taxonomy, such that the first taxonomy of the anchor product and the second taxonomy of the most similar product have at least the two highest levels that are exactly the same and the lowest levels that are different, wherein the determining the most similar product from the group of products further comprises:

training a neural network using manually-created sets of similar products;

inputting product information of the anchor product and product information of each product of the group of products into the trained neural network;

performing, using a cosine similarity layer of the trained neural network, a comparison between product information of the anchor product and product information of each product of the group of products, the comparison comprising applying a cosine similarity function to at least one vector of the anchor product and at least one vector of each product of the group of products; and determining, based on the comparison, that the product information of the anchor product is closest to product information of the most similar product; and associating, by the one or more processors, the anchor product and the most similar product with one another in a product collection.

* * * * *